United States Patent
Darak et al.

(10) Patent No.: US 11,043,099 B1
(45) Date of Patent: Jun. 22, 2021

(54) SYSTEMS AND METHODS FOR ISSUING PROACTIVE PARENTAL CONTROL ALERTS

(71) Applicant: Symantec Corporation, Mountain View, CA (US)

(72) Inventors: Anand Darak, Pune (IN); Pallavi Rajput, Pune (IN)

(73) Assignee: NortonLifeLock Inc., Tempe, AZ (US)

( * ) Notice: Subject to any disclaimer, the term of this patent is extended or adjusted under 35 U.S.C. 154(b) by 0 days.

(21) Appl. No.: 16/369,474

(22) Filed: Mar. 29, 2019

(51) Int. Cl.
| | |
|---|---|
| G06F 3/00 | (2006.01) |
| G08B 21/02 | (2006.01) |
| G08B 27/00 | (2006.01) |
| G06K 9/00 | (2006.01) |
| H04N 7/18 | (2006.01) |
| G06F 3/01 | (2006.01) |

(52) U.S. Cl.
CPC .......... *G08B 21/0208* (2013.01); *G06F 3/011* (2013.01); *G06K 9/00302* (2013.01); *G08B 21/0233* (2013.01); *G08B 27/005* (2013.01); *H04N 7/185* (2013.01); *G06F 2203/011* (2013.01)

(58) Field of Classification Search
CPC ............... G08B 21/0208; G06F 2203/011
See application file for complete search history.

(56) References Cited

U.S. PATENT DOCUMENTS

| | | | | |
|---|---|---|---|---|
| 2016/0070245 | A1* | 3/2016 | Lee | A61B 5/0004 700/49 |
| 2018/0032126 | A1* | 2/2018 | Liu | G06K 9/00302 |
| 2018/0212959 | A1* | 7/2018 | Mukherjee | H04L 63/205 |
| 2019/0297384 | A1* | 9/2019 | Bist | G06Q 50/01 |
| 2020/0037943 | A1* | 2/2020 | Chaja | G06F 9/542 |

FOREIGN PATENT DOCUMENTS

WO   WO-2016083216 A1 *  6/2016   ....... H04N 21/44218

\* cited by examiner

*Primary Examiner* — Qutbuddin Ghulamali
(74) *Attorney, Agent, or Firm* — FisherBroyles, LLP

(57) ABSTRACT

The disclosed computer-implemented method for issuing proactive parental control alerts may include (i) monitoring, through a sensor of the computing device, sensor data indicating an emotional state of a child consuming media content through the computing device, (ii) detecting, through analyzing the sensor data, that the media content has triggered an adverse emotional state within the child, and (iii) performing a security action, in response to detecting that the media content has triggered the adverse emotional state within the child, by issuing an alert in connection with a parental control software system that controls access by the child to media content. Various other methods, systems, and computer-readable media are also disclosed.

20 Claims, 6 Drawing Sheets

US 11,043,099 B1

SYSTEMS AND METHODS FOR ISSUING PROACTIVE PARENTAL CONTROL ALERTS

BACKGROUND

The modern World Wide Web environment can be stressful for individuals, including especially children. The modern World Wide Web environment still in many ways is largely unregulated. One consequence of this lack of regulation is that children may nevertheless inadvertently encounter material that is inappropriate, offensive, or otherwise disturbing. As one illustrative example, in some situations children may encounter disturbing games such as "Blue Whale."

In view of the above, it may be desirable to check the emotional states of users, such as children, while they interact with the modern World Wide Web or interact with media content more generally. For example, parents may wish to monitor for external factors such as raging and harassment, which can adversely affect a child's state of mind. In some drastic situations, a failure to effectively monitor the emotional states of children can lead to depression or even suicide. The present disclosure, therefore, identifies and addresses a need for improved systems and methods for issuing proactive parental control alerts.

SUMMARY

As will be described in greater detail below, the present disclosure describes various systems and methods for issuing proactive parental control alerts. In one example, a computer-implemented method for issuing proactive parental control alerts may include (i) monitoring, through a sensor of a computing device, sensor data indicating an emotional state of a child consuming media content through the computing device, (ii) detecting, through analyzing the sensor data, that the media content has triggered an adverse emotional state within the child, and (iii) performing a security action, in response to detecting that the media content has triggered the adverse emotional state within the child, by issuing an alert in connection with a parental control software system that controls access by the child to media content.

In one embodiment, the sensor of the computing device corresponds to a camera. In one embodiment, the sensor of the computing device corresponds to a video camera. In further embodiments, the sensor data indicates a facial expression of the child. In some examples, detecting the emotional state within the child may include analyzing the sensor data to identify the emotional state corresponding to the facial expression.

In one embodiment, the sensor of the computing device corresponds to a biometric sensor. In one embodiment, the sensor of the computing device corresponds to a microphone.

In some examples, detecting that the media content has triggered the adverse emotional state within the child is based at least in part on detecting a background contextual factor. In one embodiment, the background contextual factor corresponds to detecting that the child is consuming media content that has been categorized within the parental control software system as potentially inappropriate. In one embodiment, the background contextual factor corresponds to detecting an instance of raging involving the child and/or an instance of harassment involving the child.

In one embodiment, a system for implementing the above-described method may include (i) a monitoring module, stored in memory, that monitors, through a sensor of a computing device, sensor data indicating an emotional state of a child consuming media content through the computing device, (ii) a detection module, stored in memory, that detects, by analyzing the sensor data, that the media content has triggered an adverse emotional state within the child, (iii) a performance module, stored in memory, that performs a security action, in response to detecting that the media content has triggered the adverse emotional state within the child, by issuing an alert in connection with a parental control software system that controls access by the child to media content, and (iv) at least one physical processor configured to execute the monitoring module, the detection module, and the performance module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) monitor, through a sensor of the computing device, sensor data indicating an emotional state of a child consuming media content through the computing device, (ii) detect, through analyzing the sensor data, that the media content has triggered an adverse emotional state within the child, and (iii) perform a security action, in response to detecting that the media content has triggered the adverse emotional state within the child, by issuing an alert in connection with a parental control software system that controls access by the child to media content.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
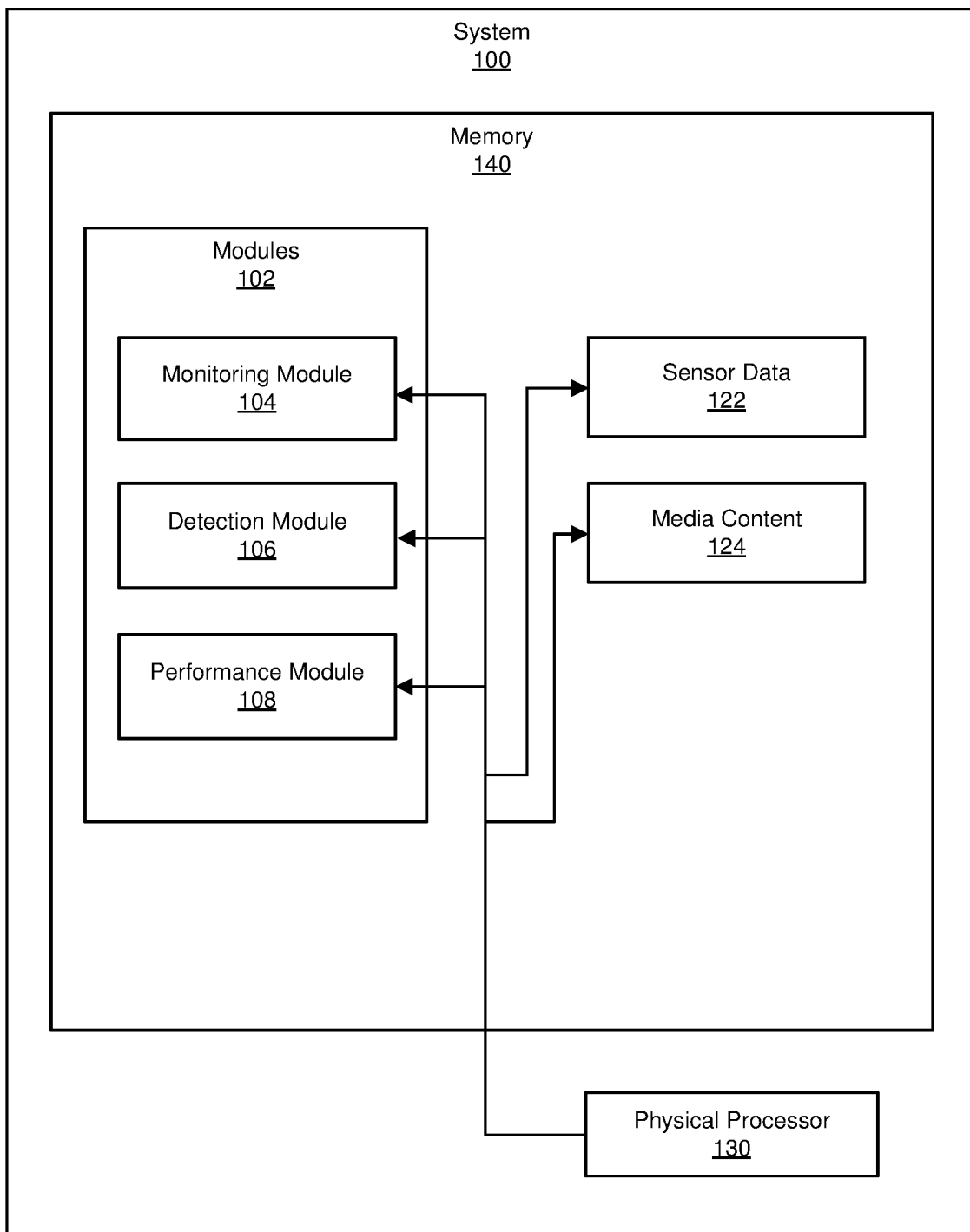
FIG. 1 is a block diagram of an example system for issuing proactive parental control alerts.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for issuing proactive parental control alerts. The disclosed subject matter may improve upon related systems by leveraging the capabilities of one or more sensors, such as microphones, cameras, or video cameras, etc., to improve the capabilities of parental control software systems that control the access that children or other individuals have to media content. The disclosed subject matter may leverage these capabilities of sensors in a novel and inventive manner, as further discussed below. More specifically, the disclosed subject matter may leverage the capabilities of such sensors to dynamically monitor, and detect, situations where media content has triggered an adverse emotional reaction. The disclosed subject matter may thereby effectively and immediately enable one or more parents or guardians to receive an alert in order to perform a proactive remedial action in response to detecting that a child is experiencing an adverse emotional reaction.

Figure 2:
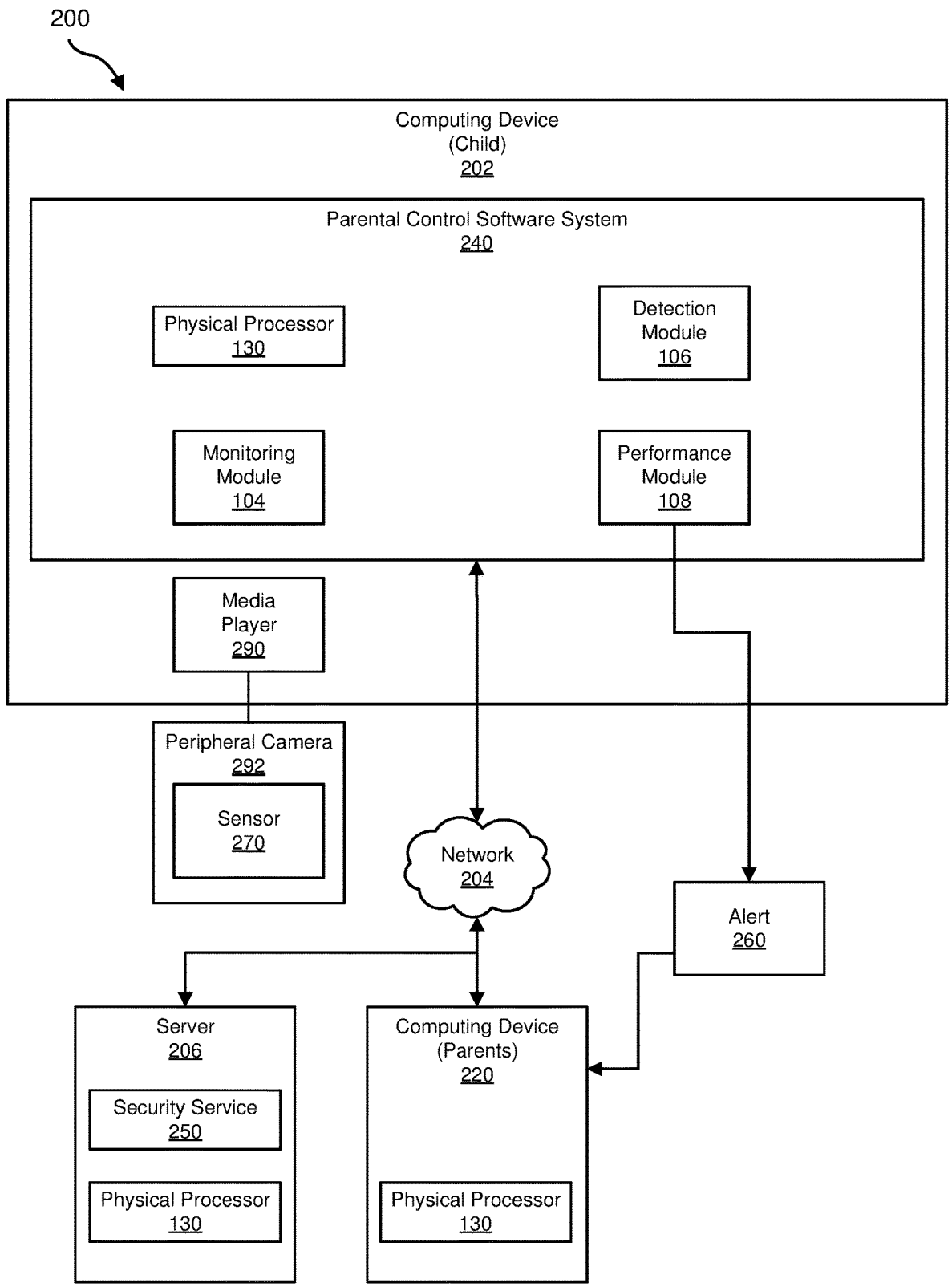
FIG. 2 is a block diagram of an additional example system for issuing proactive parental control alerts.

The following will provide, with reference to FIGS. 1-2, detailed descriptions of example systems for issuing proactive parental control alerts. Detailed descriptions of corresponding computer-implemented methods will also be provided in connection with FIGS. 3-4. In addition, detailed descriptions of an example computing system and network architecture capable of implementing one or more of the embodiments described herein will be provided in connection with FIGS. 5 and 6, respectively.

FIG. 1 is a block diagram of example system 100 for issuing proactive parental control alerts. As illustrated in this figure, example system 100 may include one or more modules 102 for performing one or more tasks. For example, and as will be explained in greater detail below, example system 100 may include a monitoring module 104 that monitors, through a sensor of a computing device, sensor data 122 indicating an emotional state of a child consuming media content, such as media content 124, through the computing device. Example system 100 may additionally include a detection module 106 that detects, through analyzing sensor data 122, that media content 124 has triggered an adverse emotional state within the child. Example system 100 may also include a performance module 108 that performs a security action, in response to detecting that media content 124 has triggered the adverse emotional state within the child, by issuing an alert in connection with a parental control software system that controls access by the child to media content such as media content 124. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate issuing proactive parental control alerts. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to issue proactive parental control alerts.

For example, and as will be described in greater detail below, monitoring module 104 may monitor, through a sensor 270 (e.g., a sensor within a peripheral camera 292 or other capture device) of computing device 202, sensor data 122 indicating an emotional state of a child consuming media content 124 through computing device 202 and/or through another distinct computing device (e.g., a separate tablet, smart phone, or other computing device). Detection module 106 may detect, through analyzing sensor data 122, that media content 124 has triggered an adverse emotional state within the child. Performance module 108 may perform a security action, in response to detecting that media content 124 has triggered the adverse emotional state within the child, by issuing an alert 260 in connection with a parental control software system 240 that controls access by the child to media content such as media content 124. Alert 260 may optionally be transmitted to a computing device associated with the parents of the child, such as a computing device 220. Media content 124 may optionally be played through a media player 290, such as a web browser, gaming interface, and/or other media interface.

Parental control software system 240 may also optionally interface with a backend server, such as a server 206, of a security vendor, such as SYMANTEC CORPORATION, to facilitate the performance of method 300. More specifically, server 206 may optionally provide a security service 250 that coordinates and interfaces with parental control software system 240.

Computing device 202 generally represents any type or form of computing device capable of reading computer-executable instructions. One illustrative example of computing device 202 may include a tablet for consuming media content, such as textual, audio, visual, video, and/or multimedia content. Additional examples of computing device 202 include, without limitation, laptops, desktops, servers, cellular phones, Personal Digital Assistants (PDAs), media players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of facilitating the performance of method 300. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
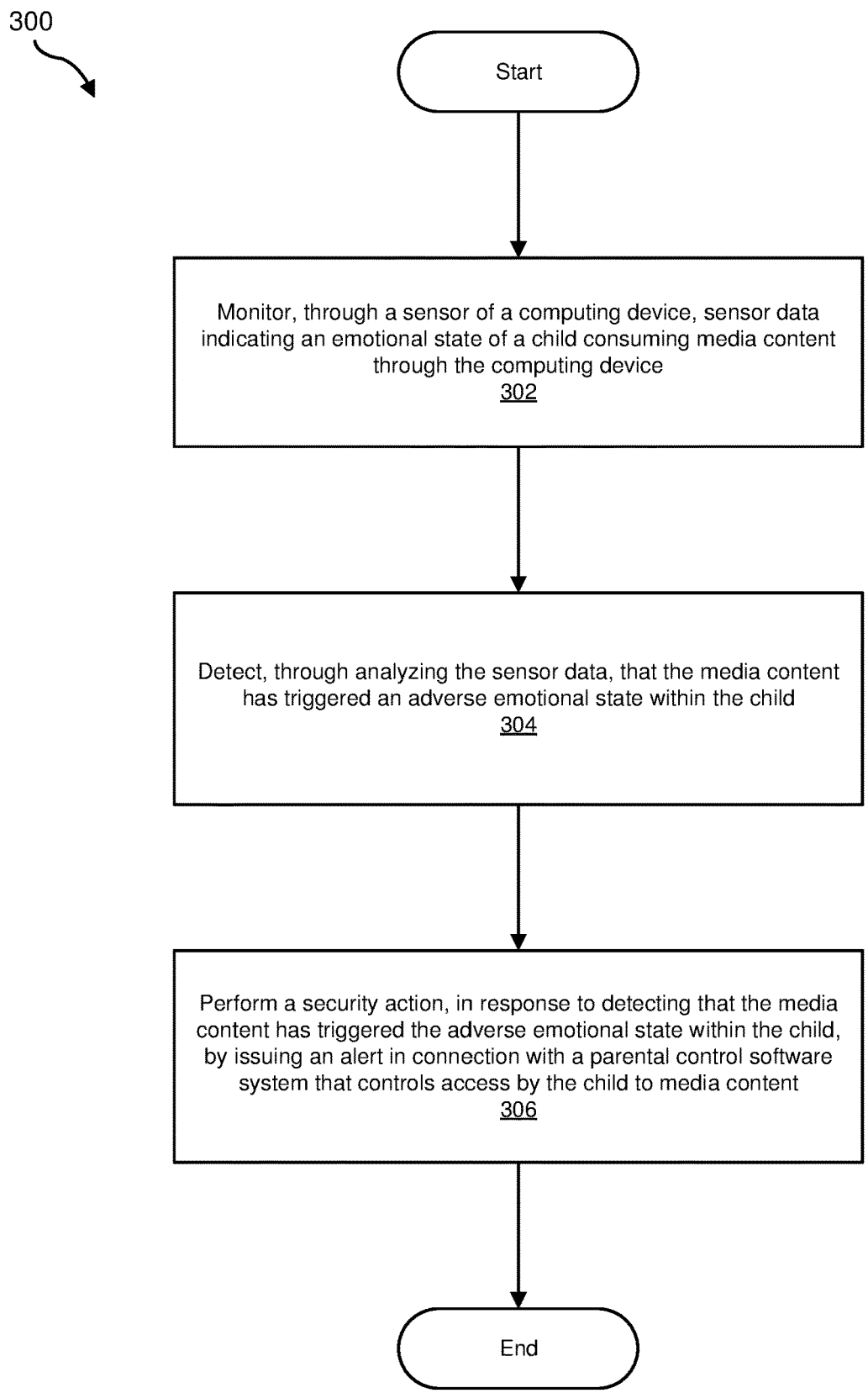
FIG. 3 is a flow diagram of an example method for issuing proactive parental control alerts.

FIG. 3 is a flow diagram of an example computer-implemented method 300 for issuing proactive parental control alerts. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may monitor, through a sensor of the computing device, sensor data indicating an emotional state of a child consuming media content through the computing device. For example, monitoring module 104 may, as part of computing device 202 in FIG. 2, monitor, through sensor 270 of computing device 202, an emotional state of a child consuming media content 124 through computing device 202.

Monitoring module 104 may monitor the sensor data in a variety of ways. In one embodiment, the sensor of the computing device corresponds to a camera. In further embodiments, the sensor of the computing device corresponds to a video camera. In embodiments such as the camera and video camera embodiments, the sensor data may optionally indicate a facial expression of the child. In some examples, detection module 106 may detect the emotional state within the child by analyzing the sensor data to identify the emotional state corresponding to the facial expression, as discussed in more detail below regarding step 304 of method 300.

In one embodiment, the sensor of the computing device corresponds to a biometric sensor. For example, the sensor of the computing device may measure a pulse, blood pressure level, brainwave, etc., and/or any other suitable item of biometric measurement information. For example, the biometric sensor may be embedded within a smart wristwatch or wristband, such as a wristband that monitors biometric data or other data such as a number of steps walked during the day. Additionally, or alternatively, the sensor of the computing device may correspond to a microphone. Of course, in some examples the sensor of the computing device may correspond to any permutation of the above illustrative examples of such sensors. For example, a video camera may record visual, audio, and/or video information, and may also interface with one or more biometric sensors.

At step 304, one or more of the systems described herein may detect, through analyzing the sensor data, that the media content has triggered an adverse emotional state within the child. For example, detection module 106 may, as part of computing device 202 in FIG. 2, detect, through analyzing sensor data 122, that media content 124 has triggered an adverse emotional state within the child.

Detection module 106 may detect, through analyzing the sensor data, that the media content has triggered the adverse emotional state within the child in a variety of ways. In one illustrative example, detection module 106 may detect that the media content has triggered the adverse emotional state within the child at least in part by analyzing sensor data indicating a photograph of the child's face. For example, the photograph may record a facial expression that the child is expressing at a specific point in time. Of course, a similar technique may be applied to video sensor data rather than still image data. Detection module 106 may optionally analyze the photograph to extract, or otherwise detect, a specific type or category of facial expression that the child is expressing. For example, a facial expression corresponding to a smile may indicate that the child is currently happy or otherwise not expressing distress. In contrast, a facial expression corresponding to a frown or a facial expression corresponding to crying tears may indicate that the child actually is expressing distress. Accordingly, detection module 106 may optionally analyze the photograph in an attempt to categorize a facial expression and thereby determine whether the child is currently expressing distress or not.

Of course, additionally or alternatively, detection module 106 may similarly analyze one or more items of audio information in an attempt to extract whether the audio information indicates that the child is expressing distress. For example, detection module 106 may attempt to determine whether audio information indicates that one or more vocal expressions from the child has a tone, volume, frequency, or cadence that corresponds to the child expressing distress. Similarly, detection module 106 may optionally perform one or more instances of voice recognition to extract a string of one or more words that the child has vocalized. Upon extracting one or more words from the vocal expressions of the child, detection module 106 may further attempt to analyze whether these words correspond to words associated with distress or emotional frustration, etc. As one illustrative example, detection module 106 may optionally detect that the child has verbalized one or more words that correspond to profanity and/or words that correspond to expressions of emotional distress, such as "hate," "suicide," "depressed," etc. Furthermore, detection module 106 may optionally analyze both visual data (e.g., the analysis of one or more facial expressions that are outlined above) in combination with audio data (e.g., the analysis of one or more vocal attributes and/or words expressed verbally by the child) to determine whether these two separate sets of information, in aggregate, indicate that the child is expressing emotional distress.

Additionally, or alternatively, detection module 106 may detect that the media content has triggered the adverse emotional state within the child based at least in part on detecting a background contextual factor. In other words, a background contextual factor may provide additional information, in addition to the sensor data information described above regarding cameras and microphones, etc., that may further enhance a level of confidence that the child is, or is not, experiencing emotional distress. For example, in some embodiments, the background contextual factor corresponds to detecting that the child is consuming media content that has been categorized within the parental control software system as potentially inappropriate. In these examples, the parental control software system may analyze the sensor data indicating the facial expression and/or vocal information detected by the sensor as the child watches media content, and may also further analyze the media content itself to determine whether the media content has been categorized as potentially inappropriate, offensive, or disturbing, etc.

In view of the above, a determination that the media content has been categorized as potentially inappropriate may increase a level of confidence that one or more items of visual or audio information indicate that the child is actually expressing emotional distress. As one specific example, a rating category for a videogame indicating that the videogame is appropriate for mature audiences may further enhance a level of confidence that a facial expression captured by a peripheral video camera corresponds to a facial expression indicating emotional distress. Similarly, a rating category for a movie indicating that the movie has been rated as restricted to adults may further enhance a level of confidence that a vocal expression captured by the peripheral video camera corresponds to a vocal expression indicating emotional distress, such as crying and/or terror.

Additionally, or alternatively, in further examples the background contextual factor corresponds to detecting at least one of: an instance of raging involving the child and/or an instance of harassment involving the child. In these examples, detection module 106 may optionally detect whether the child himself or herself is exhibiting raging, such as turning red in the face, violently pounding his or her hands on the table, and/or yelling or screaming. Alternatively, detection module 106 may detect whether the child is the recipient or target of another child or user exhibiting raging behavior. Similarly, in further examples detection module 106 may detect whether the child is a victim of harassment, such as verbal harassment over a textual or video chat with other users. Of course, detection module 106 may also detect whether the child himself or herself is the perpetrator of such harassment against another user or child as a victim.

At step 306, one or more of the systems described herein may perform a security action, in response to detecting that the media content has triggered the adverse emotional state within the child, by issuing an alert in connection with a parental control software system that controls access by the child to media content. For example, performance module 108 may, as part of computing device 202 in FIG. 2, perform a security action, in response to detecting that media content 124 has triggered the adverse emotional state within the child, by issuing alert 260 in connection with parental control software system 240 that controls access by the child to media content such as media content 124.

Performance module 108 may perform the security action in a variety of ways. As used herein, the term "security action" generally refers to any action that the parental control software system may initiate, facilitate, trigger, and/or perform to assist a parent or guardian in addressing or remediating problems associated with detecting that the child is experiencing emotional distress. As one illustrative example, the security action may correspond to computing device 202 issuing an alert, such as alert 260. Alert 260 may take the form of a telephone message, text message, email message, pop-up message, forum message, pager message, and/or any other suitable form of electronic or other communication to thereby notify the parent or guardian that the child is experiencing emotional distress. Additionally, or alternatively, the security action may correspond to logging one or more items of data, including potentially metadata, describing attributes involving the interaction with the content that triggered the child to express emotional distress. For example, the parental control software system may log the specific time and the specific item of media content that triggered the child to experience emotional distress. The parental control software system may also optionally log any other suitable item of metadata describing the interaction with the media content that triggered the child to experience emotional distress.

Additionally, or alternatively, the parental control software system may also optionally perform any other suitable type of security action to help assist the parent or guardian in addressing the emotional distress of the child. For example, the parental control software system may inhibit, throttle, limit, block, quarantine, and/or stop the interaction between the child and the media content. The parental control software system may propose a suitable child-friendly alternative to the media content that is triggering the child to express emotional distress. The parental control software system may also optionally provide one or more helpful instructions, prompts, and/or warnings to the child to help motivate the child to stop watching the media content, to watch less of the media content, and/or to seek out consolation and/or protection from a parent, guardian, and/or other suitable adult.

Figure 4:
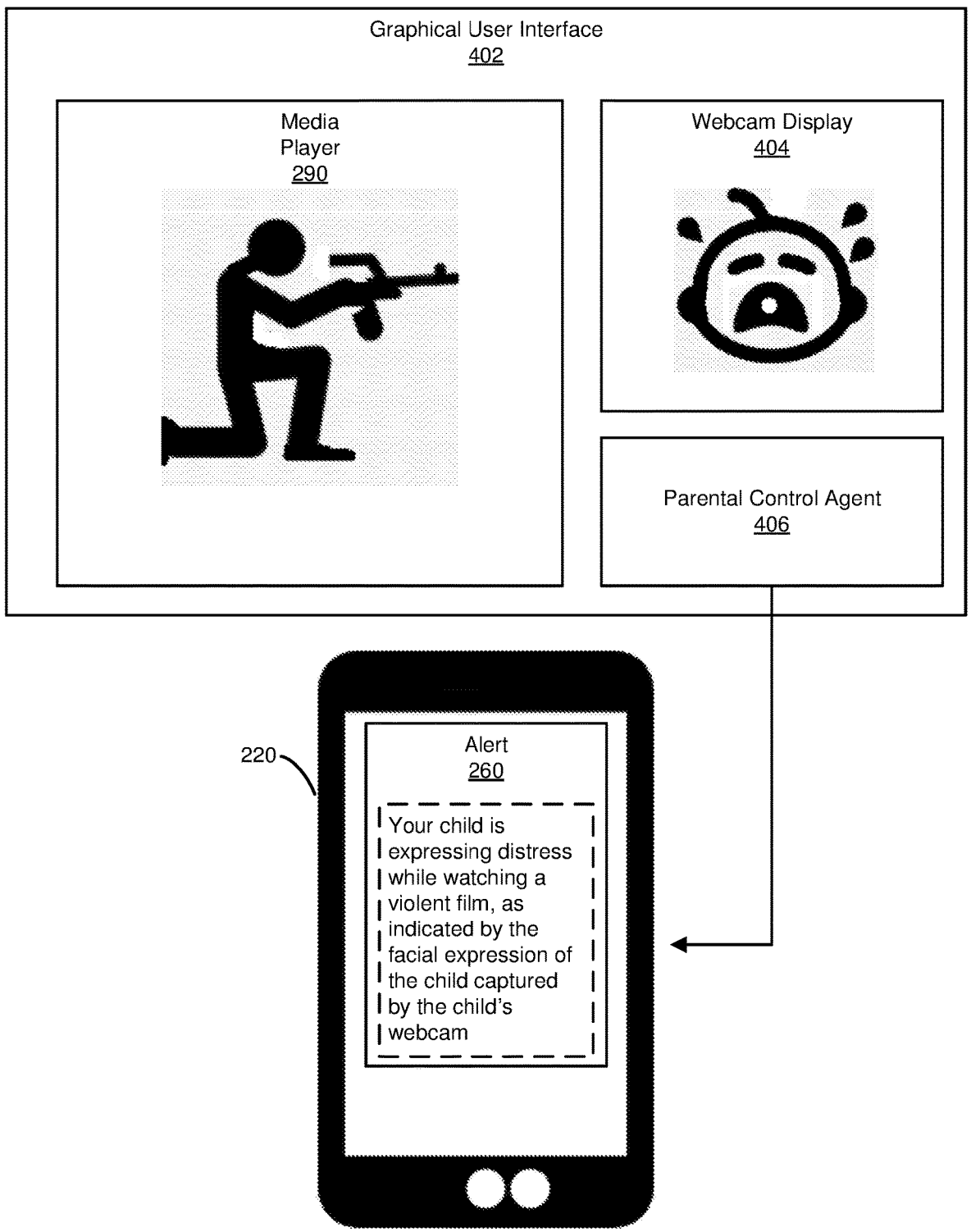
FIG. 4 is a block diagram of an example workflow corresponding to the method for issuing proactive parental control alerts.

FIG. 4 shows an example workflow corresponding to method 300, as further discussed above. As further shown in this figure, the workflow may begin at a graphical user interface 402, which may be located at computing device 202 where the child is consuming media content, as further discussed above regarding FIG. 2. This figure also further illustrates how graphical user interface 402 may include media player 290, webcam display 404, and/or a parental control agent 406. Of course, the graphical display of webcam display 404 and/or parental control agent 406 may be optional, especially since it may not be helpful or desirable for the child to see one or more of these items. For example, it may be helpful or desirable to not draw the child's attention to the fact that a parental control software system is monitoring the child, including monitoring the child's facial expression through a corresponding webcam.

In fact, in some scenarios it may be helpful for the webcam to be monitoring the child without the light indicator on the webcam being turned on, thereby preventing the light from tipping off the child to the fact that the webcam is monitoring the child. Webcam display 404 may simply display a result of sensor 270 within peripheral camera 292 monitoring the child as the child consumes media content through media player 290. Moreover, parental control agent 406 may correspond to a background process executing in connection with parental control software system 240.

As further shown in FIG. 4, the child may be consuming media content corresponding to a violent film (or any other item of potentially inappropriate media content that may trigger the child to express emotional distress) through media player 290. In the specific example of FIG. 4, the child may be consuming a violent war film that depicts a soldier shooting a machine gun. Accordingly, FIG. 4 also further illustrates how webcam display 404 may show a result of peripheral camera 292 capturing a facial expression indicating that the child is expressing emotional distress.

Of course, in addition to the sensor data associated with webcam display 404, detection module 106 may also optionally use any other suitable item of microphone, biometric, and/or other sensor data in the performance of method 300. FIG. 4 also further illustrates how, within webcam display 404, the child is depicted as crying, because the child is experiencing emotional distress while watching the violent war film shown within media player 290. Accordingly, parental control agent 406 (e.g., as part of performance module 108) may perform a security action by issuing an example of alert 260. More specifically, parental control agent 406 may transmit alert 260 from computing device 202, which corresponds to where the child is consuming media content, to computing device 220, which corresponds to a smart phone or other computing device of the parent or guardian of the child benefiting from the performance of method 300 and the corresponding instance of parental control software system 240. Alert 260 provides a helpful notification to the parent or guardian regarding the emotional distress that the child is experiencing while watching the violent film. Of course, in addition to simply notifying the parent or guardian regarding the emotional distress that the child is experiencing, parental control agent 406 may also optionally perform any one or more of the illustrative examples of security actions that are outlined above, including throttling or blocking access to the media content and/or issuing one or more helpful warnings, prompts, and/or notifications to the child.

As further discussed above, the disclosed subject matter may improve upon related systems by leveraging the capabilities of one or more sensors, such as microphones, cameras, or video cameras, etc., to improve the capabilities of parental control software systems that control the access that children or other individuals have to media content. The disclosed subject matter may leverage these capabilities of sensors in a novel and inventive manner, as further discussed above. More specifically, the disclosed subject matter may leverage the capabilities of such sensors to dynamically monitor, and detect, situations where media content has triggered an adverse emotional reaction. The disclosed subject matter may thereby effectively and immediately enable one or more parents or guardians to receive an alert in order to perform a proactive remedial action in response to detecting that the child is experiencing an adverse emotional reaction.

Figure 5:
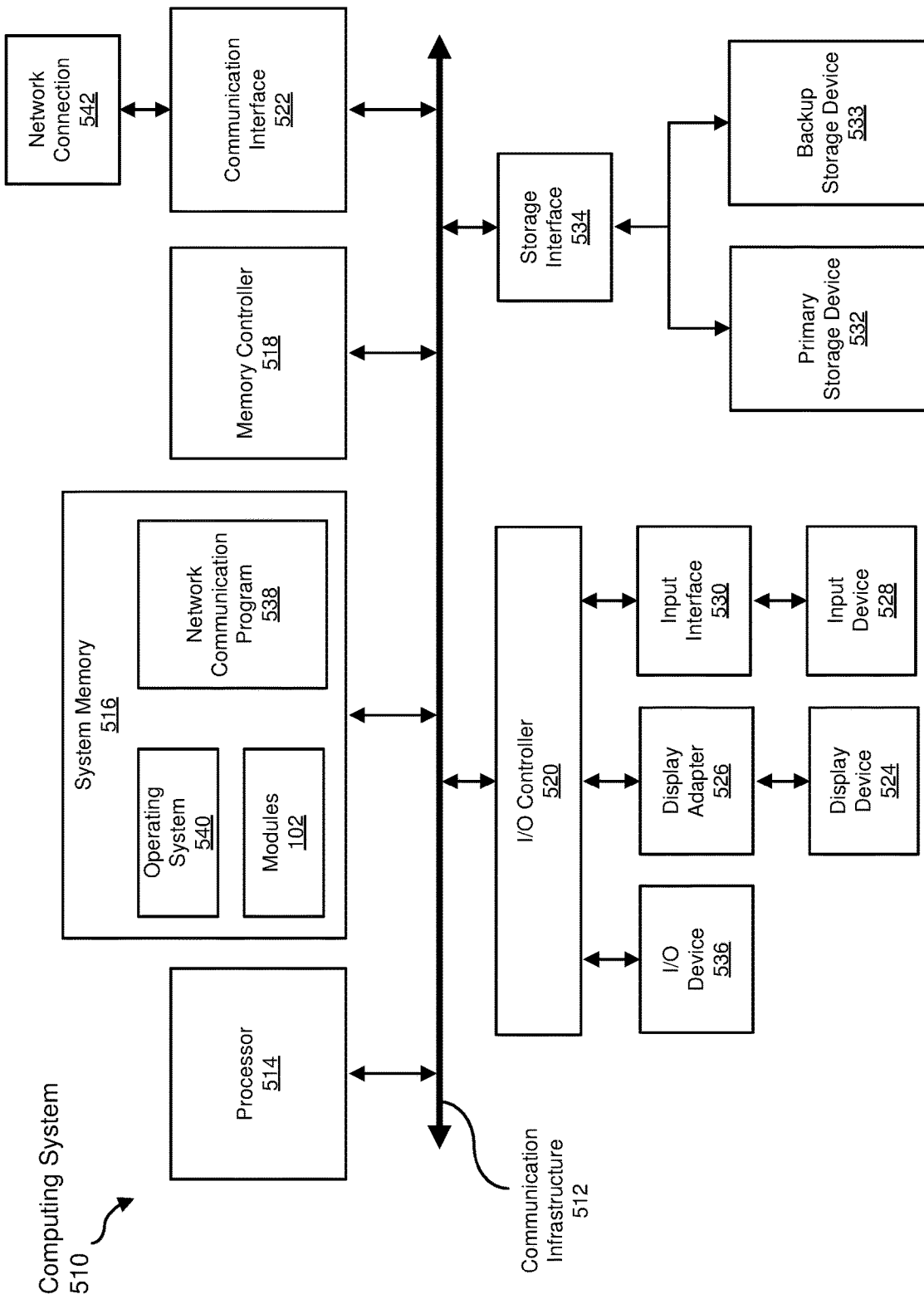
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
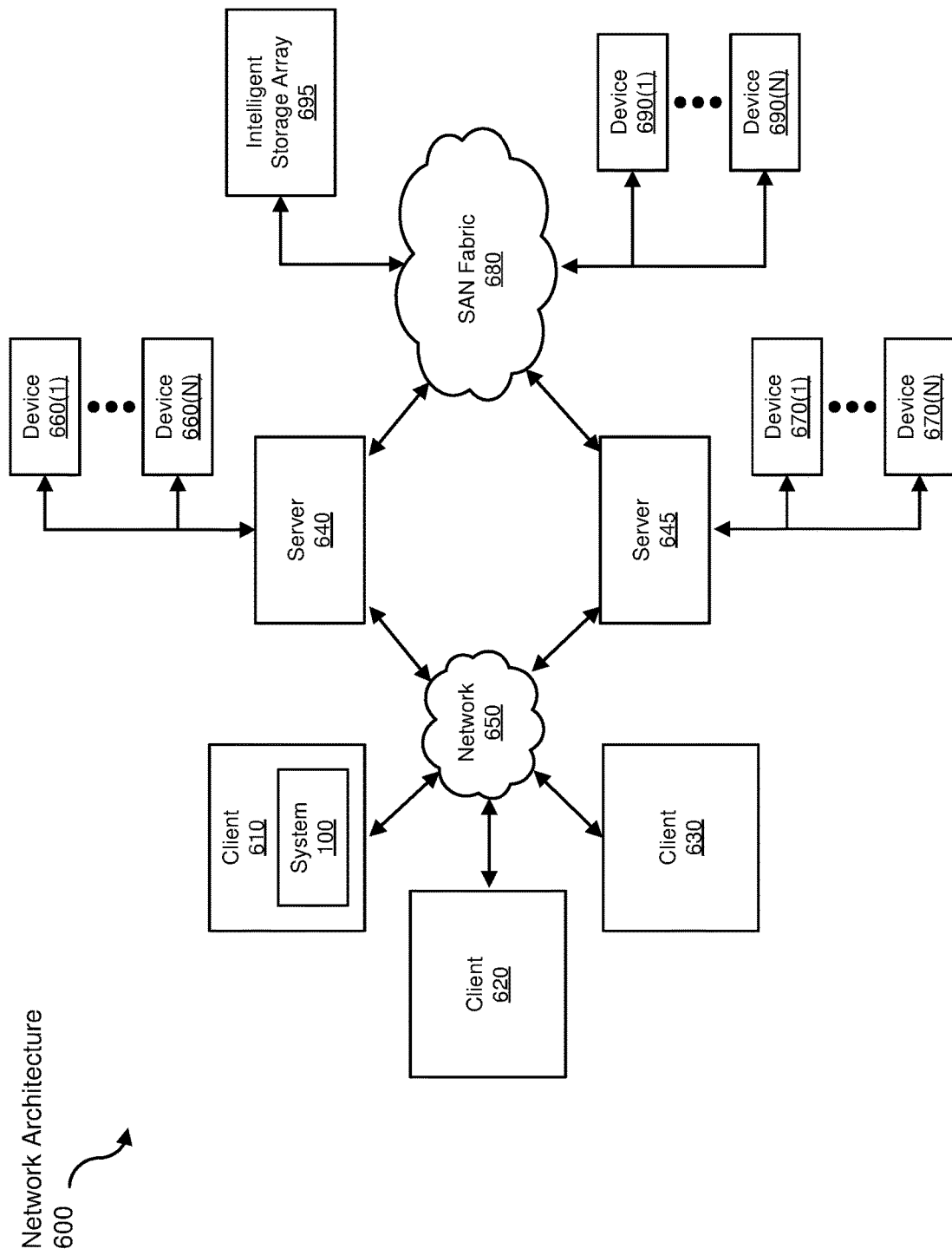
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the present disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for issuing proactive parental control alerts.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for issuing proactive parental control alerts, at least a portion of the method being performed by a computing device comprising at least one processor, the method comprising:
    monitoring, through a sensor of the computing device, sensor data indicating an emotional state of a child consuming media content through the computing device;
    detecting, through analyzing the sensor data and based at least in part on detecting a background contextual factor, that the media content has triggered an adverse emotional state within the child; and
    performing a security action, in response to detecting that the media content has triggered the adverse emotional state within the child, by issuing an alert in connection with a parental control software system that controls access by the child to media content;
    wherein the alert triggers a graphical user interface prompt to a guardian of the child that indicates that a camera has detected that the child is experiencing the adverse emotional state in response to consuming the media content and allows the guardian to inhibit or stop the interaction with the media content.

2. The computer-implemented method of claim 1, wherein the sensor of the computing device corresponds to the camera.

3. The computer-implemented method of claim 2, wherein the sensor of the computing device corresponds to a video camera.

4. The computer-implemented method of claim 2, wherein the sensor data indicates a facial expression of the child.

5. The computer-implemented method of claim 4, wherein detecting the emotional state within the child comprises analyzing the sensor data to identify the emotional state corresponding to the facial expression.

6. The computer-implemented method of claim 1, wherein the sensor of the computing device corresponds to a biometric sensor.

7. The computer-implemented method of claim 1, wherein the sensor of the computing device corresponds to a microphone.

8. The computer-implemented method of claim 1, wherein the adverse emotional state corresponds to fear.

9. The computer-implemented method of claim 1, wherein the background contextual factor corresponds to detecting that the child is consuming media content that has been categorized within the parental control software system as potentially inappropriate.

10. The computer-implemented method of claim 1, wherein the background contextual factor corresponds to detecting at least one of:
    an instance of raging involving the child; or
    an instance of harassment involving the child.

11. A system for issuing proactive parental control alerts, the system comprising:
    a monitoring module, stored in a memory, that monitors, through a sensor of a computing device, sensor data indicating an emotional state of a child consuming media content through the computing device;
    a detection module, stored in the memory, that detects, through analyzing the sensor data and based at least in part on detecting a background contextual factor, that the media content has triggered an adverse emotional state within the child; and
    a performance module, stored in the memory, that performs a security action, in response to detecting that the media content has triggered the adverse emotional state within the child, by issuing an alert in connection with a parental control software system that controls access by the child to media content;
    wherein the alert triggers a graphical user interface prompt to a guardian of the child that indicates that a camera has detected that the child is experiencing the adverse emotional state in response to consuming the media content and allows the guardian to inhibit or stop the interaction with the media content; and
    at least one physical processor configured to execute the monitoring module, the detection module, and the performance module.

12. The system of claim 11, wherein the sensor of the computing device corresponds to the camera.

13. The system of claim 12, wherein the sensor of the computing device corresponds to a video camera.

14. The system of claim 12, wherein the sensor data indicates a facial expression of the child.

15. The system of claim 14, wherein the detection module detects the emotional state within the child by analyzing the sensor data to identify the emotional state corresponding to the facial expression.

16. The system of claim 11, wherein the sensor of the computing device corresponds to a biometric sensor.

17. The system of claim 11, wherein the sensor of the computing device corresponds to a microphone.

18. The system of claim 11, wherein the adverse emotional state corresponds to fear.

19. The system of claim 11, wherein the background contextual factor corresponds to detecting that the child is consuming media content that has been categorized within the parental control software system as potentially inappropriate.

20. A non-transitory computer-readable medium comprising one or more computer-readable instructions that, when executed by at least one processor of a computing device, cause the computing device to:
    monitor, through a sensor of the computing device, sensor data indicating an emotional state of a child consuming media content through the computing device;

detect, through analyzing the sensor data and based at least in part on detecting a background contextual factor, that the media content has triggered an adverse emotional state within the child; and perform a security action, in response to detecting that the media content has triggered the adverse emotional state within the child, by issuing an alert in connection with a parental control software system that controls access by the child to media content;

wherein the alert triggers a graphical user interface prompt to a guardian of the child that indicates that a camera has detected that the child is experiencing the adverse emotional state in response to consuming the media content and allows the guardian to inhibit or stop the interaction with the media content.

* * * * *